United States Patent
Rubin et al.

(10) Patent No.: US 9,107,032 B2
(45) Date of Patent: Aug. 11, 2015

(54) METHOD OF COLLECTING PER-USER PERFORMANCE DATA

(75) Inventors: Harvey Rubin, Morristown, NJ (US); Jean-Michel Pugeat, Paris (FR); Baoling S. Sheen, Naperville, IL (US); Dennis J. Wiest, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1032 days.

(21) Appl. No.: 12/545,607

(22) Filed: Aug. 21, 2009

(65) Prior Publication Data

US 2011/0044283 A1    Feb. 24, 2011

(51) Int. Cl.
*H04L 12/50* (2006.01)
*H04W 8/02* (2009.01)
*H04W 80/04* (2009.01)
*H04W 24/08* (2009.01)

(52) U.S. Cl.
CPC ............... *H04W 8/02* (2013.01); *H04W 80/04* (2013.01); *H04W 24/08* (2013.01)

(58) Field of Classification Search
CPC .................................................... H04W 80/04
See application file for complete search history.

(56) References Cited

U.S. PATENT DOCUMENTS

| | | | |
|---|---|---|---|
| 7,480,511 B2 * | 1/2009 | O'Meagher | 455/456.1 |
| 2007/0218905 A1 * | 9/2007 | Lee | 455/436 |
| 2009/0054065 A1 * | 2/2009 | Voyer et al. | 455/436 |
| 2009/0059829 A1 * | 3/2009 | Bachmann et al. | 370/311 |

OTHER PUBLICATIONS

3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8) Jun. 2009.

* cited by examiner

*Primary Examiner* — Samina Choudhry
(74) *Attorney, Agent, or Firm* — Davidson Sheehan LLP

(57) ABSTRACT

The present invention provides a method for implementation in a wireless communication system including a plurality of base stations, a plurality of gateways, and a plurality of mobility management entities. The method includes receiving, at a first mobility management entity and from a first base station, measurement data collected by the first base station for a first mobile unit having a connection to the wireless communication system via the first base station. The measurement data includes a temporary identifier associated with the first mobile unit for the duration of the connection. The method also includes identifying the first mobile unit using the temporary identifier and forming a first record associated with the first mobile unit. The first record includes the measurement data collected by the first base station for the first mobile unit and previously collected measurement data for the first mobile unit.

24 Claims, 4 Drawing Sheets

METHOD OF COLLECTING PER-USER PERFORMANCE DATA

BACKGROUND OF THE INVENTION

1. Field of the Invention

This invention relates generally to communication systems, and, more particularly, to wireless communication systems.

2. Description of the Related Art

Wireless communication systems use a geographically dispersed network of base stations to provide wireless connectivity to large numbers of mobile units. The term "Node B" is used in 3G UMTS standards as the name for the base stations. The term "Evolved Node B (eNB)" is used in the 4G LTE (Long Term Evolution) standards as the name for the base stations that implement the 4G LTE standard. Unlike wired communication systems, the quality of a wireless communication link or connection is both geographically and temporally variable. Furthermore, the quality of service received by individual users is an important factor in determining customer satisfaction. Service providers can bill higher rates for guaranteed higher quality of service levels. Wireless operators like Verizon Wireless use data generated by the wireless communication system to assess the overall user experience in wireless communication systems. One approach is to use performance counters to generate statistical information related to the user experience. The performance counters typically gather statistical information to assess the performance of interfaces between elements of the wireless communication system and to assess the performance of the software implemented in these elements.

Another approach to monitoring the user experience is to collect performance data in near real time for each wireless user. One example of this type of information is Per-Connection Measurement Data (PCMD) that is used to capture statistics related to the user experience each time the wireless user accesses the network or performs other procedures. In proposed 4G wireless networks, the PCMD data is collected by different network elements. For example, eNodeBs (eNBs) may collect one type of PCMD data, mobility management entities (MMEs) may collect another type of PCMD data, and serving gateways (SGWs) may collect yet another type of PCMD data. The collected data can then be stored in the network element until it is needed by a post-processing tool. Records of the stored data are therefore labeled by an indicator of the identity of the user equipment. However, each of the collecting entities uses a different user equipment identifier. For example, an MME uses an International Mobile Subscriber Identity (IMSI) to uniquely identify the user equipment, whereas the eNodeBs are unaware of the IMSI and instead they use a negotiated temporary identifier that is associated with each user equipment for the duration of the call session with the eNodeB.

User equipment can also roam through numerous areas served by different eNodeBs, MMEs, and/or other network elements that can collect PCMD data. Consequently, the post-processing tool has to search through information stored on all of the network elements that collect PCMD data within the network when the post-processing tool wants to begin analyzing the PCMD data for one or more users. Locating the per-user information collected by the different network elements is a nontrivial task because typical wireless communication system may include thousands of eNodeBs and tens or hundreds of MMEs and SGWs. The problem is exacerbated by the fact that the different network elements use different identifiers for the same user equipment and some of these identifiers are temporary identifiers that may be released from their association with user equipment when the user equipment ends a particular connection.

Furthermore, the PCMD records collected by a network element for each user during the each time interval have to be correlated with the records collected by the other network elements so that the post-processing tool can analyze the records for each user equipment as a single record. Correlating the per-user information collected by the different network elements is a nontrivial task because the records collected by the different network elements may not be coordinated. For example, in the 3GPP standards, as many as three network elements can generate PCMD records for the same user and the network elements may generate the records at slightly different times. Hence, correlation of these records for the same user connection can be difficult to achieve. Again, the use of different identifiers by different network elements further complicates this task.

Storing the collected information may also present difficulties. For example, it is typical for each network element to deposit PCMD records on a host collector. Depositing per-user data collected for millions of users by thousands of eNodeBs, tens or hundreds of MMEs, and similar numbers of other network elements can easily overwhelm the capacity of even a large number of host collectors. Hence, another issue to cope with is the generation of a multiplicity of files on the host collector and the disk storage capacity required to store multiple files for the same user connection to the network.

Wireless providers that want to initiate (or terminate) PCMD data collection are also faced with the problem of signaling their intent to large numbers of network elements. For example, a wireless provider may want to turn ON the data collection functionality for a certain period of time and then they may want to turn OFF the data collection. Typically, PCMD collection is controlled by Element Management Systems that utilize management interfaces to each and every Network Element to turn ON PCMD or to turn it OFF. However, as discussed herein, a typical 4G LTE Wireless Network can have thousands of individual elements, which may require multiple Element Management Systems. Coordination of the data collection among several Element Management Systems may be difficult to achieve.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in a wireless communication system including a plurality of base stations and a plurality of mobility management entities. The method includes receiving, at a first mobility management entity and from a first base station, measurement data collected by the first base station for a first mobile unit having a connection to the wireless communication system via the first base station. The measurement data includes a temporary identifier associated with the first mobile unit for the duration of the connection. The method also includes identifying the first mobile unit using the temporary identifier and forming a first record associated with the first mobile unit. The first record includes the measurement data collected by the first base station for the first mobile unit and previously collected measurement data for the first mobile unit.

In another embodiment, a method is provided for implementation in a wireless communication system including a plurality of base stations and a plurality of mobility management entities. The method includes collecting, at a first base station, measurement data for a first mobile unit that has a connection to the wireless communication system via the first base station. The method also includes providing, from the first base station to a first mobility management entity, the measurement data and a temporary identifier associated with the first mobile unit for the duration of the connection.

In yet another embodiment, a method is provided for implementation in a wireless communication system including a plurality of base stations, a plurality of gateways, and a plurality of mobility management entities. The method includes collecting, at a first gateway, measurement data for a first mobile unit having a connection to the wireless communication system via the first base station. The method also includes providing, from the first gateway to a first mobility management entity, the measurement data and a permanent identifier associated with the first mobile unit.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
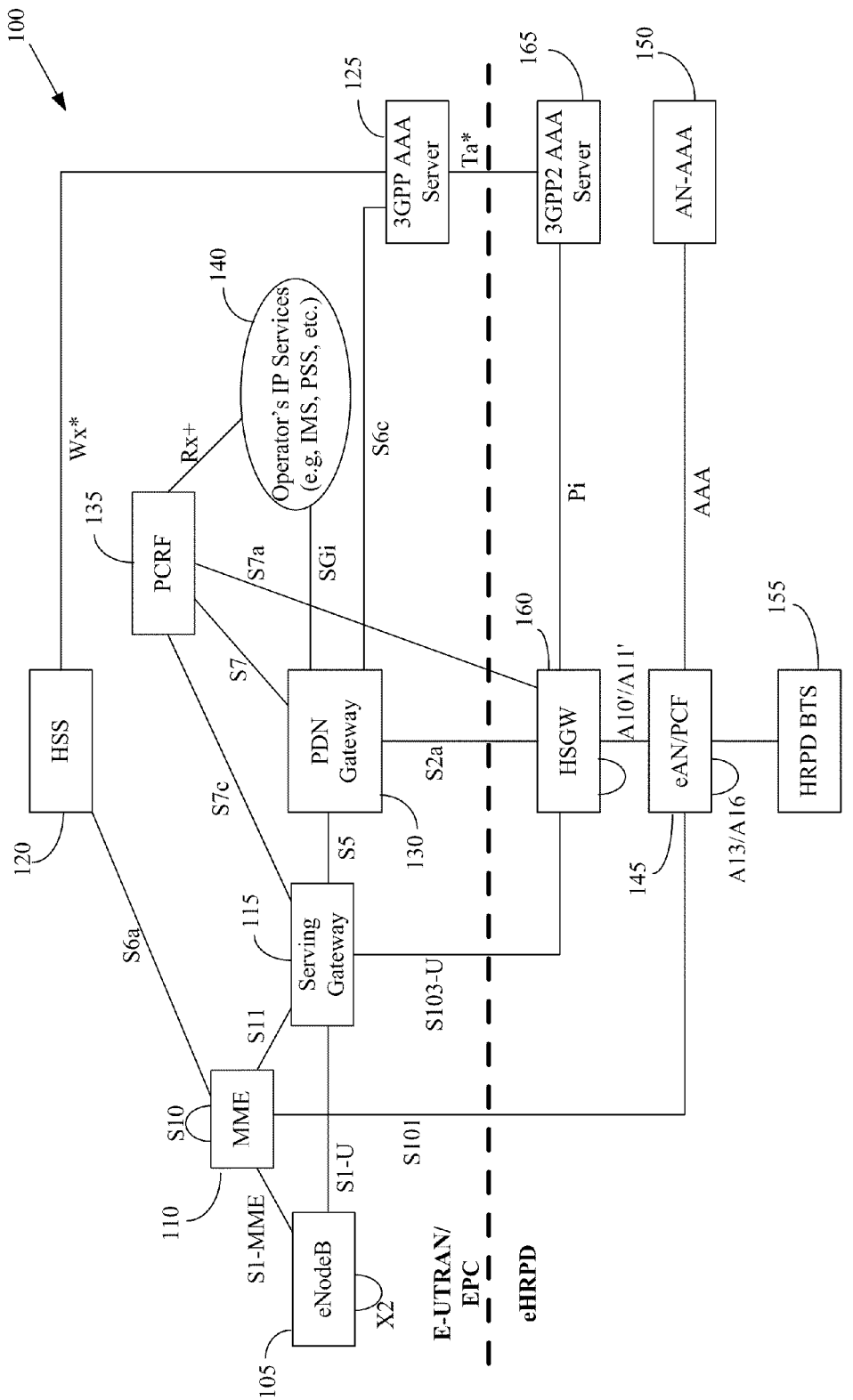
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, the wireless communication system 100 includes a portion that is configured according to the Evolved Universal Terrestrial Radio Access Network (E-UTRAN) and Evolved Packet Core (EPC) standards and/or protocols. The collection of Evolved Node B elements is referred to as the E-UTRAN in the 3GPP 4G (LTE) standards. The illustrated embodiment of the wireless communication system 100 also includes a portion that is configured according to High Rate Packet Data (HRPD) standards and/or protocols. Persons of ordinary skill in the art having benefit of the present disclosure should appreciate that the elements depicted in FIG. 1 are intended to provide an illustrative context for the techniques described herein and are not intended to limit the scope of the present application. Furthermore, in the interest of clarity, only those aspects of the wireless communication system 100 that are relevant to the techniques described herein will be discussed in detail.

Wireless access or connectivity to the wireless communication system 100 is provided by base stations or other types of wireless access points. The term "base station" will be used in the present application to refer generically to functional elements that provide wireless connectivity, such as access points, radio access networks, base station routers, node-Bs, eNodeBs, and the like. In the illustrated embodiment, a base station 105 is used to provide wireless connectivity. The base station 105 is referred to as an eNodeB in FIG. 1 and this designation is intended to indicate that the base station 105 includes functionality that is not implemented in conventional node-Bs. The base station 105 is connected to a mobility management entity 110 and a serving gateway 115 using interfaces. In the illustrated embodiment, the interface between the base station 105 and the mobility management entity 110 is an S1-MME interface, the interface between the base station 105 and the serving gateway 115 is an S1-U interface, and the interface between the mobility management entity 110 and the serving gateway 115 is an S11 interface. These interfaces are defined by the 3GPP standards and only those aspects of these interfaces that are relevant to the claimed subject matter will be discussed herein.

In the E-UTRAN-EPC portion of the wireless communication system 100, the mobility management entity 110 is connected to a home subscriber server (HSS) 120 that stores information related to the subscribers that can access the system 100. The HSS 120 is also coupled to an authentication, authorization, and accounting (AAA) server 125. The serving gateway 115 is interfaced with a packet data network (PDN) gateway 130 and a policy and charging rules function (PCRF) 135. In the illustrated embodiment, both the PDN gateway 130 and the PCRF 135 interface with the operator's Internet protocol services 140 such as an IP multimedia subsystem. The PDN gateway 130 also interfaces with the AAA server 125.

In the HRPD portion of the wireless communication system 100, the mobility management entity 110 is connected to an access network packet control function (AN/PCF) 145, which interfaces with another AAA server 150. In the illustrated embodiment, wireless connectivity to the HRPD portion of the wireless communication system 100 may also be provided by a base transceiver station (HRPD BTS) 155, which is in communication with the access network 150. The serving gateway 115 is coupled to a HRPD serving gateway 160, which is also coupled to an AAA server 165.

Various elements in the wireless communication system 100 include functionality that enables these elements to collect Per-Connection Measurement Data (PCMD), which is performance data collected in near real time for each wireless user. Although elements in the wireless communication system 100 are configured to collect PCMD data, persons of ordinary skill in the art having benefit of the present disclosure should appreciate that the techniques described herein may be applied to the collection of any type of per-user tracing and/or tracking data related to mobile units in wireless communication system 100. For example, embodiments of the techniques described herein may be utilized to coordinate the operation of different network elements when these network elements are configured to simultaneously and/or concurrently collect data associated with particular mobile units.

The PCMD data may be focused on capturing statistics related to the user experience in each access of the network 100 by a wireless user. In the illustrated embodiment, the PCMD data is collected by the base station 105, a mobility management entity 110, and a serving gateway 115. However, persons of ordinary skill in the art having benefit of the present disclosure should appreciate that in alternative embodiments a different set of network elements may be used to collect the PCMD data. The PCMD records collected by the different network elements for the same user during the same time interval are correlated so that a post-processing tool can recover all the records for the same user connection and proceed to analyze those records as a single record. In the illustrated embodiment, the mobility management entity 110 receives, combines, and/or correlates the PCMD data records generated by the different elements to form records for each user, as will be discussed in detail herein.

Figure 2:
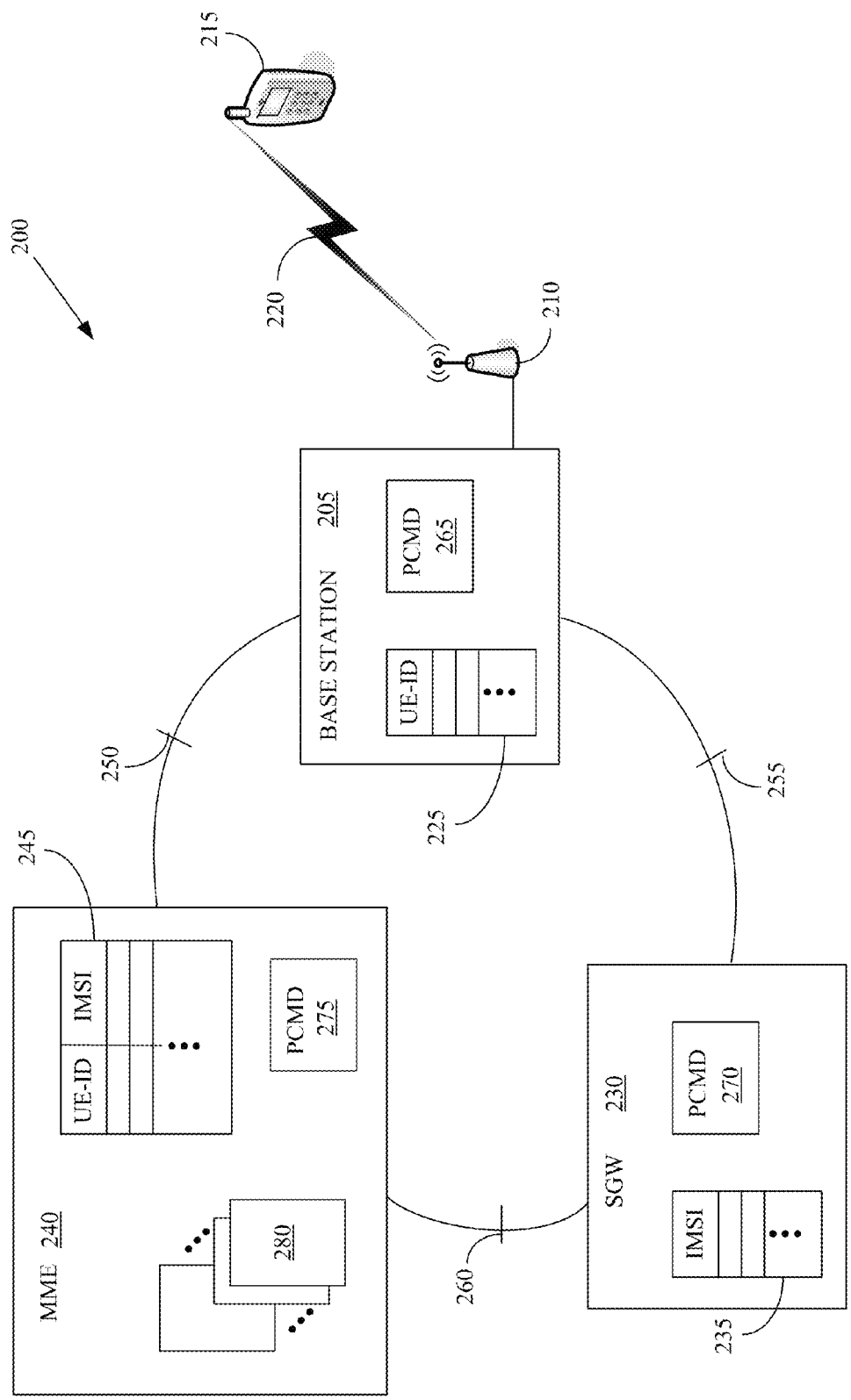
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes at least one base station 205 that uses one or more antennas 210 to establish wireless connectivity with one or more mobile units 215 over an air interface 220. The base station 205 provides processing of the air interface 220 and is the node that is in direct communication with the mobile unit 215, which may also be called User Equipment (UE). There can be thousands of base stations 205 in an LTE wireless network. The base station 205 identifies the mobile units 215 using an identifier assigned by the base station 205 and made known to the mobility management entity 240. This identifier is unique across the interfaces between the base station 205 and a set of MMEs (including the mobility management entity 240) associated with the base station 205. This identifier is assigned to the mobile unit 215 when a call session and/or radio bearer is established between the base station 205 and the mobile unit 215 over the air interface 220. In one embodiment, the identifier is a temporary identifier that can be used to identify the mobile unit 215 for the duration of the call session. However, once the call session has ended, the mobile unit 215 may no longer be associated with the temporary identifier. For example, the temporary identifier may be released when the call session ends and may then be assigned to a different mobile unit. In the illustrated embodiment, the base station 205 maintains a database 225 that includes a list of the identifiers of the currently active call sessions and mobile units.

The second exemplary embodiment of the wireless communication system 200 also includes a serving gateway 230 that provides an interface to the E-UTRAN elements for the purpose of tunneling the application data packets sent by a UE to the wider network. Each mobile unit 215 in the wireless communication system 200 is associated with a single serving gateway 230 that performs a variety of functions such as being the local mobility anchor point for base station handovers and internetwork mobility, providing packet routing and forwarding services, and the like. In the illustrated embodiment, the serving gateway 230 identifies the mobile units 215 using the IMSI assigned to the mobile unit 215. The serving gateway 230 therefore maintains a database 235 that includes a list of the identifiers of the currently active call sessions and mobile units associated with the serving gateway 230.

A mobility management entity 240 is also included in the second exemplary embodiment of the wireless communication system 200. The mobility management entity 240 generally includes functionality for managing mobility of the mobile units 215 as they roam through the wireless communication system 200. Exemplary functions that may be performed by embodiments of the mobility management entity 240 include signaling with the mobile unit 215 (i.e., NAS signaling) and security thereof, signaling with the eNB and SGW to support mobility, signaling to support inter-network mobility, management of idle mobile units, maintenance of tracking area lists, and performing mobile unit reachability procedures. The mobility management entity 240 interfaces to the base station 205 to manage mobile unit mobility. Whenever a mobile unit establishes communications paths through the network to carry user information, the mobility management entity 240 interfaces with both the base station 205 and the serving gateway 230 to establish these paths, which are typically called bearers or radio bearers. The serving gateway 230 in turn interfaces with other gateway elements (not shown) to complete the bearer path through the wireless network. Depending on different deployment scenarios, there can be anywhere from a few to around 20 MMEs in the network, and anywhere from 20 to 100 serving gateway 230 elements in the wireless network, with a similar number of other gateway elements.

The mobility management entity 240 identifies mobile units 215 using the unique or permanent identifier assigned to the mobile units, such as an International Mobile Subscriber Identity (IMSI), which can be signaled to the mobility management entity 240 using an NAS message transmitted by the mobile unit 215. The base station 205 is not aware of the IMSI assigned to the mobile units 215 because the contents of the NAS signaling message (including the IMSI) are not read by the base station 205. The mobility management entity 240 therefore uses the temporary identifier known to the base station 205 to identify the mobile unit 215 and associate it with the correct IMSI. In the illustrated embodiment, the mobility management entity 240 maintains a database 240 that includes the IMSI values and the temporary identifiers for each mobile unit. The database 240 can be used to associate the temporary identifiers with the correct IMSI values while the relevant call session remains active.

The base station 205, the serving gateway 230, and the mobility management entity 240 communicate over interfaces 250, 255, 260. In the illustrated embodiment, the interface 250 between the mobility management entity 240 and the base station 205, the interface 255 between the serving gateway 230 and the base station 205, and the interface 260 between the mobility management entity 240 and the serving gateway 230 are extended to provide the control necessary for the PCMD collection and combination capability described herein. For example, the interface 250 is called S1-AP in the 3G PPP standards. The conventional S1-AP carries a set of standardized messages that are grouped into sets called procedures. In one embodiment, there is a set of messages used for the Attach Procedure, another set used for the Detach Procedure, etc. Each S1-AP message carries an information element that is used to specify the procedure to which the message being carried belongs. There are currently about 36 procedures specified in the S1-AP interface, leaving many code points that are unused. In the illustrated embodiment, one code point may be selected and denoted by the name PCMD Procedure. This procedure can then be used to carry messages and/or information related to the collection of PCMD data, as discussed in detail herein. However, persons of ordinary skill in the art having benefit of the present disclosure should appreciate that the exemplary procedure outlined herein is intended to be illustrative and that the conventional interface may alternatively be modified in other ways. For example, an S1 Private Message can be used to carry PCMD information between the base station 205 and the MME 240.

The base station 205, the serving gateway 230, and the mobility management entity 240 also include PCMD functionality 265, 270, 275 that can be used to collect PCMD data associated with the mobile unit 215. In one embodiment, collection of the PCMD data can be turned on or off at the discretion of the network operator or service provider. For example, when the network operator wants to turn PCMD ON or OFF in the network, an Element Management System (not shown) may send appropriate management messages only to the relatively small number of mobility management entities 240 in the wireless communication system 200. Each mobility management entity 240 may in turn send a PCMD Procedure message over its S1-AP interface 250 to each base station 205 to inform it to turn the PCMD functionality 265 ON or OFF, as appropriate.

When the PCMD functionality 265 is turned ON, each base station 205 begins to collect performance data for each mobile unit 215 connected through it to the wireless communication system 200. At an appropriate event trigger point for sending the PCMD record for the mobile unit 215, the base station 205 sends a PCMD Procedure message to the mobility management entity 240 and delivers the UE-specific PCMD data collected by the base station 205. Exemplary procedures and/or event trigger points may include attach procedures, service request procedures, idle mode procedures, handoff procedures, release procedures, and detach procedures. Persons of ordinary skill in the art having benefit of the present disclosure should also appreciate that other procedures and/or event trigger points may be defined and used to trigger collection and/or transmission of the PCMD data.

The mobility management entity 240 can then add the PCMD data received from the base station 205 to the PCMD information that it collects using the PCMD functionality 275, as well as other previously collected PCMD data. For example, as the mobile unit 215 moves through the wireless communication system 200, the mobile unit 215 is handed off from one base station to another. Each base station generates a PCMD record when the mobile unit 215 moves to another base station, e.g., when a handoff procedure is performed. Of course, the PCMD functionality in the base stations has to have been turned ON at the target base station to allow PCMD data collection to be continued on that base station. These other base stations may also generate PCMD records for other procedures that occur while the mobile unit 215 is attached to the base stations. By using the unique identifier (e.g., the IMSI) assigned to the mobile unit 215, the mobility management entity 240 can combine and correlate the records generated by different entities within the wireless communication system 200 even though the temporary identifier assigned by the base stations may change as call sessions are initiated and ended. The mobility management entity 240 can form a single record 280 for each mobile unit within the system and index this record using the IMSI or other identifier that is permanently assigned to the mobile unit 215. The mobility management entity 240 can also incorporate PCMD transmitted from the serving gateway 230 into the record 280.

Consequently, a single record 280 may be generated at the mobility management entity 240 for each mobile unit, even though a set of records is being generated by each of the base stations involved in handling a specific user. The single PCMD data record 280 accumulated at the mobility management entity 240 can be deposited on a PCMD data collection server (not shown). Because a single PCMD record 280 is generated, rather than multiple records generated by the mobility management entity 240 (and identified by the IMSI) and other records generated by each of a set of base stations (and identified by temporary identifiers which may no longer exist or be associated with the mobile unit that generated the record), the post-processing tool can easily find the record 280 and does not need to track down and/or correlate multiple records. Furthermore, embodiments of the techniques described herein may use less disk storage used at the data collection host to store the PCMD records collected by all the different network elements. This may offer a substantial advantage over collection schemes that generate multiple independent records on the data collection host for the same user connection at multiple Network Elements.

In one embodiment, the S1-AP interface modification described herein can be implemented by adding a proprietary extension to the S1-AP interface. This extension can be implemented so that it does not interfere with the standardized use of the S1-AP interface. However, the use of the extension may be limited to the MME and eNB elements of the same manufacturer, unless the details of the extension are shared among different manufacturers. The mobility management entity may therefore have to learn the identities of the base stations with which it can operate for PCMD collection purposes. The following is an example of how this information can be exchanged without provisioning any information into the MME for this purpose. Each base station may be provisioned by the network operator with a name that is assigned to the base station. This name may be passed to the mobility management entity when the base station instantiates its S1-AP connection to the mobility management entity. The name of the base station should be defined in such a way that the mobility management entity can recognize it as a base station with which it is possible to use the PCMD Procedure extension. Alternatively, the base station can send an S1 Private Message to the MME, identifying itself as being PCMD-capable. An incompatible MME (i.e., one from a different manufacturer) can ignore this message without impacting its ability to provide standardized services with the base station.

Figure 3:
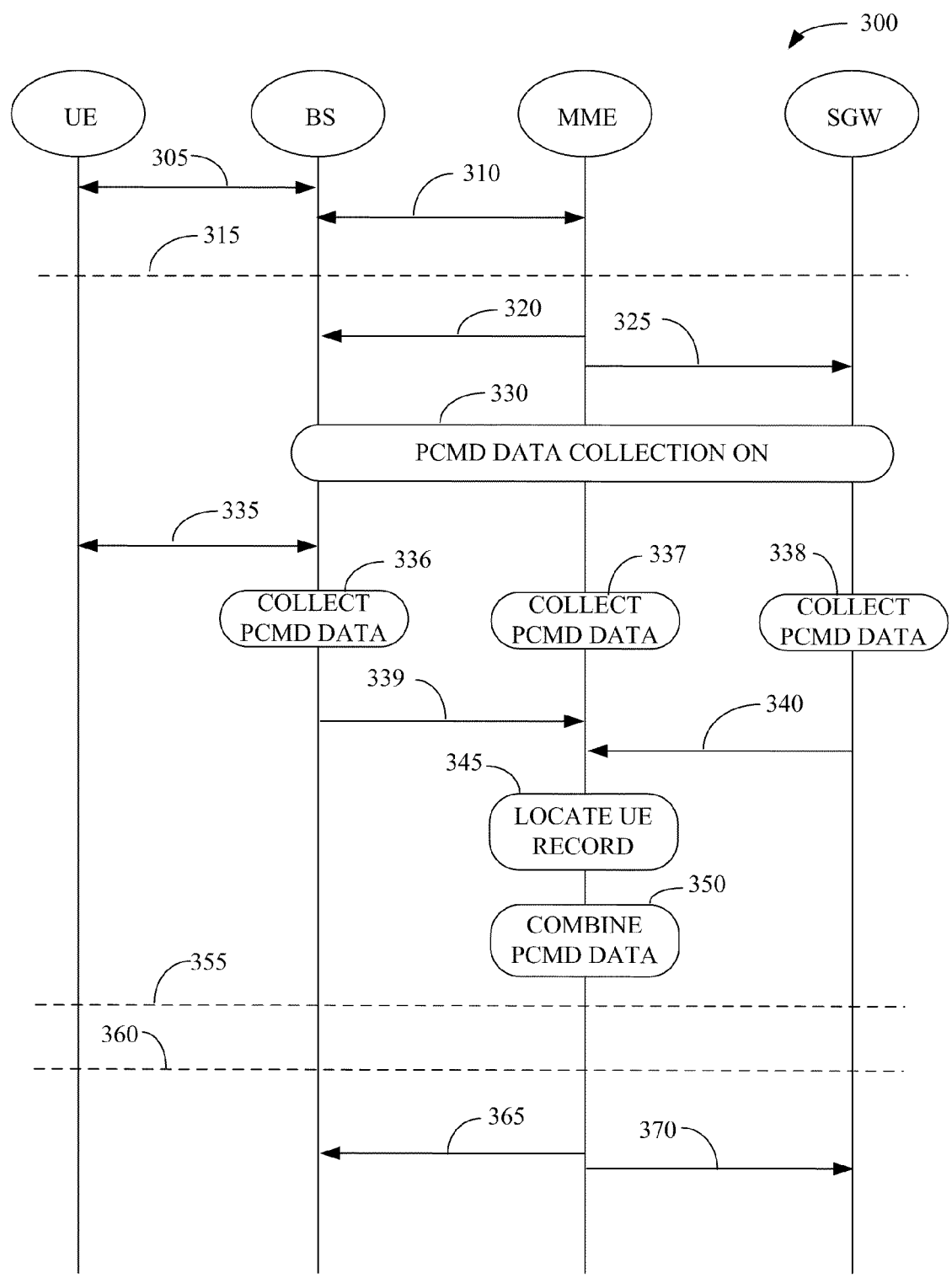
FIG. 3 conceptually illustrates one exemplary embodiment of a method of acquiring and consolidating PCMD data.

FIG. 3 conceptually illustrates one exemplary embodiment of a method 300 of acquiring and consolidating PCMD data.

In the illustrated embodiment, PCMD data for user equipment (UE) can be collected by one or more base stations (BS), serving gateways (SGW), and mobility management entities (MME). The method begins when the user equipment initiates (at 305) a call session with the base station. During the initiation (at 305) process, a temporary identifier is assigned to the user equipment and also stored in the base station. The temporary identifier may be used to identify the user equipment to the base station for the duration of the call session. The base station and the mobility management entity also set up (at 310) a connection and may establish a radio bearer for the user equipment. In one embodiment, NAS signaling is used to transmit the IMSI of the user equipment to the mobility management entity, in which case the base station is unaware of the IMSI of the user equipment. At this point (indicated by the line 315), the user equipment has established a wireless connection and call session to the network and can use this call session to communicate over the network.

The mobility management entity receives a request to turn on PCMD data collection, e.g., from a service provider or network operator, and then signals (at 320, 325) the base station and the serving gateway to turn ON their PCMD data collection functionality and begin collecting PCMD data for the user equipment. The mobility management entity also initiates PCMD data collection so that the PCMD data collection functionality is all turned on at 330. In the illustrated embodiment, a procedure is initiated (at 335) between the user equipment and the base station. In response to this procedure, the base station, the mobility management entity, and the serving gateway may collect (at 336, 337, 338) PCMD data associated with the user equipment and the initiated procedure. The base station and the serving gateway may then transmit (at 339, 340) the collected PCMD data to the mobility management entity. For example, the user equipment may transmit (at 339) a record including the collected PCMD data, the temporary identifier of the user equipment, and a timestamp indicating the time at which the data was collected. The serving gateway may transmit (at 340) a record including the collected PCMD data, the permanent identifier of the user equipment, and a timestamp indicating the time at which the data was collected.

The mobility management entity uses the information in the received records to combine and/or correlate these records with a locally collected PCMD data, as well as any previously received PCMD data. In the illustrated embodiment, the mobility management entity first uses the temporary identifier to locate (at 345) the UE's record containing the permanent identifier of the user equipment, such as the IMSI assigned to the user equipment. For example, the IMSI may be inserted into the MME's PCMD record during creation of the record. When data arrives from the base station, the MME can use the temporary identifiers, such as the MME UE S1AP ID and/or the eNB UE S1AP ID locate (at 345) the main record for the UE. The permanent identifier can then be used as an index to combine (at 350) all the available records (currently and/or previously received) associated with the user equipment into a single (main) record. For example, the MME can insert (at 350) the received data into the main record. In one embodiment, the different records may also be correlated, e.g., using the time stamps to correlate data that is collected during simultaneous or concurrent time intervals. The system may continue to collect and combine PCMD data as needed, e.g., in the interval between the lines 355, 360. During this interval, records for the different user equipment may be built up in the mobility management entity and periodically transmitted to a centralized PCMD data collector server. The consolidated records may also be transmitted to the postprocessing server for analysis, either at a predetermined interval or in response to a request.

The mobility management entity may subsequently receive a request to turn off PCMD data collection, e.g., from a service provider or network operator. In that case, the mobility management entity signals (at 365, 370) the base station and the serving gateway to stop collecting PCMD data for the user equipment. The mobility management entity may also stop collecting PCMD data. In one embodiment, all of the entities that were collecting PCMD data may transmit any remaining PCMD data to the mobility management entity in response to receiving the signal to stop collecting PCMD data. In the illustrated embodiment, the instructions to stop or start PCMD data collection have been transmitted to all of the entities in the network that are capable of PCMD data collection and they have been instructed to collect PCMD data for all user equipment. However, in alternative embodiments, the PCMD data collection process may be limited to particular entities and/or particular user equipment and the selections may be conveyed in messages transmitted by the mobility management entity. Other parameters for the PCMD data collection process may similarly be conveyed in these messages.

The amount of data collected while the PCMD data collection functionality is turned on may be quite significant. For example, a typical wireless communication system may include thousands of base stations and tens or hundreds of mobility management entities and various gateways. Furthermore, the wireless communication system may be providing wireless connectivity to millions of mobile units at any given time. In some embodiments, the PCMD data collected by the mobility management entities is transferred to a PCMD data collection server for long-term storage. Transferring such a large amount of PCMD data in real time can easily overwhelm a server. However, the flow of PCMD data to the PCMD data collection server can be managed by allowing the server to collect the information from the mobility management entities at selected time intervals.

Figure 4:
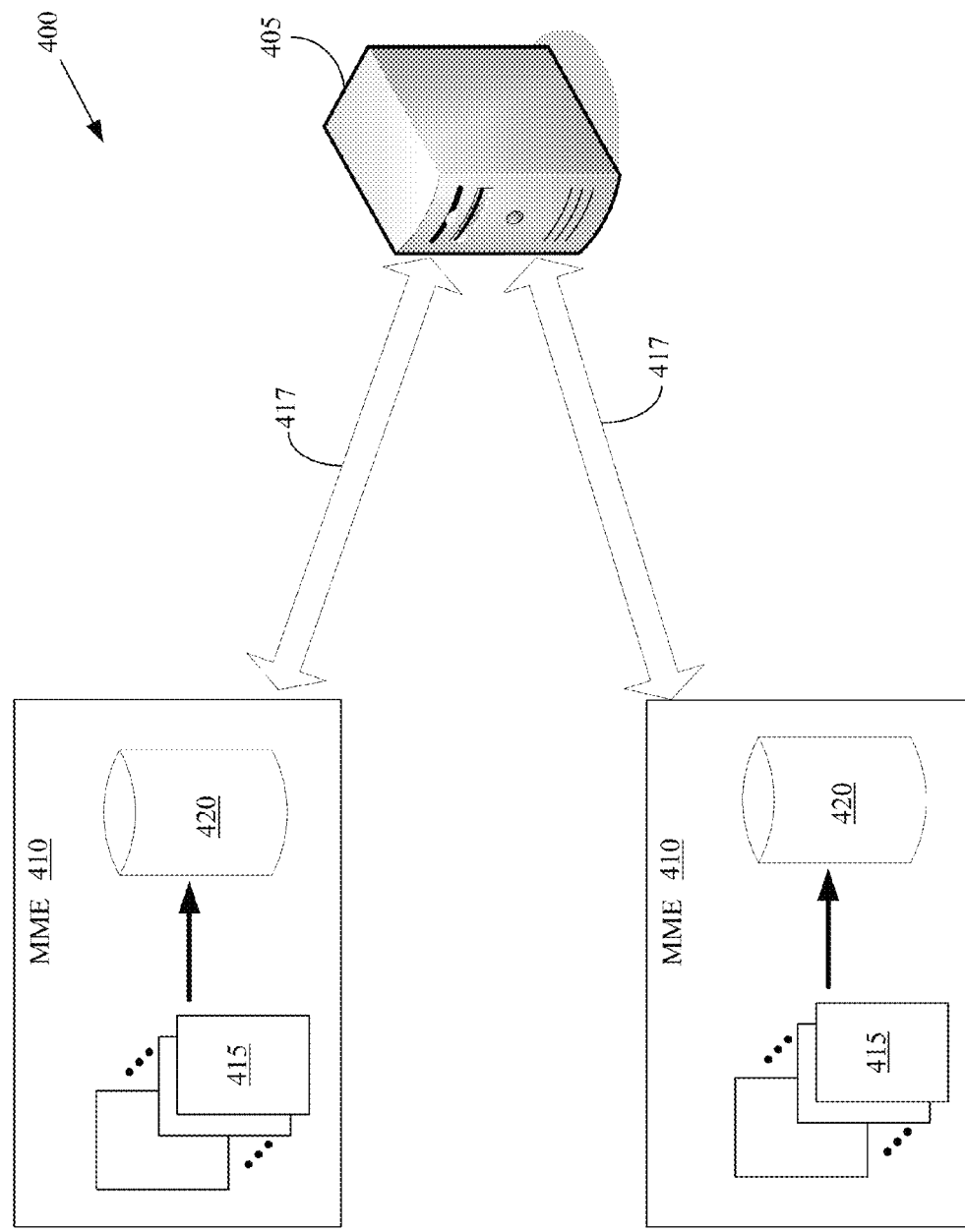
FIG. 4 conceptually illustrates a third exemplary embodiment of a wireless communication system.

FIG. 4 conceptually illustrates a third exemplary embodiment of a wireless communication system 400. In the illustrated embodiment, the wireless communication system 400 includes a data collection server 405 is configured to receive data collected by multiple mobility management entities 410. Although two mobility management entities 410 are depicted in FIG. 4, persons of ordinary skill in the art having benefit of the present disclosure should appreciate that the wireless communication system 400 may include any number of mobility management entities 410. Moreover, the wireless communication system 400 may also include more than one data collection server 405. The data collection server 405 may communicate with the mobility management entities 410 over any combination of wired and/or wireless connections 417.

In the illustrated embodiment, each mobility management entity 400 gathers consolidated records 415 that include PCMD data that has been collected for each mobile unit, as described herein. The records 415 may be gathered for a selected period of time, e.g., for a time interval of approximately one minute. At the end of the selected period of time, the records 415 may be placed in a file and the file may be transferred to a data storage device 420. Although the data storage device 420 is depicted as an integral part of the mobility management entity 410, persons of ordinary skill in the art having benefit of the present disclosure should appreciate that in alternative embodiments the data storage device 420 may be implemented at any location. A notification including information (such as a file name) indicating the contents of the file including the records 415 is then sent to the data collection server 405. In one embodiment, the notification is sent substantially immediately after the file has been transferred to the data storage device 420. Alternatively, the notification may be sent (perhaps with other notifications) at selected time intervals or in response to a request transmitted by the data collection server 405.

The data collection server 405 may then collect the files stored in the data storage device 420 in a manner that avoids overwhelming the server 405 and/or the connections 417 used to transport the data from the mobility management entities 410. In one embodiment, the data collection server may use estimates of the sizes of the stored files (which could be transmitted to the server 405 in the notification) and estimates of the available bandwidth between the mobility management entities 410 and the server 405 to control the flow of data. For example, the data collection server 405 may request the data files from the mobility management entities 410 at time intervals that are selected to allow the requested data to be transmitted over the connections 417 during the time interval using the available bandwidth. However, persons of ordinary skill in the art having benefit of the present disclosure should appreciate that other criteria may be used to determine when to transmit the data to the data collection server 405.

Embodiments of the techniques described herein may have a number of advantages over the conventional practice. For example, some implementations may reduce or eliminate the need to use the Element Management System to turn PCMD ON or OFF independently at each of the potentially thousands of network elements in the 4G LTE wireless network. The EMS interfaces only to the relatively small number of MME elements for this purpose and the MME uses its existing interfaces to the other network elements to propagate the turning ON or OFF of PCMD at those elements. Furthermore, by using extensions to the existing standardized interfaces between the network element types, PCMD data for a single user connection can be collected and integrated at a single point in the wireless network as the user moves through the network. Hence, a single PCMD record may be generated for each user connection and deposited on a PCMD Collection host, thus saving disk space on the collection host as compared with other methods. The post-processing tools used to operate on the PCMD data files do not have to be concerned about correlating and integrating a set of files from among a potentially large set of separate files to create a single record for the user connection. A single integrated record is generated by the procedures explained herein. Also, base stations that are capable of operating with the PCMD extension to the existing standardized interface between the network elements can be easily identified. This procedure is done in such a way as to leave the normal operation of the standardized interface intact. Moreover, the existing standardized interface between the base stations and the mobility management entity supports reliable data transport. Thus the PCMD data can be delivered to MME in a reliable way, which is superior to delivering the PCMD data to a separate collector using some unreliable transport protocol such as UDP.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in a wireless communication system comprising a plurality of base stations and a plurality of mobility management entities, comprising:

receiving, at a first mobility management entity and from a first base station, measurement data generated by the first base station for a first mobile unit having a connection to the wireless communication system via the first base station, the measurement data comprising a temporary identifier associated with the first mobile unit for the duration of the connection;

determining, at the first mobility management entity, a permanent identifier of the first mobile unit using the temporary identifier in the measurement data generated by the first base station; and combining, at the first mobility management entity, the measurement data generated by the first base station for the first mobile unit with measurement data generated by the first mobility management entity for the first mobile unit and previously collected measurement data for the first mobile unit to form a first record that is uniquely associated with the first mobile unit, and wherein the first record is indexed by the permanent identifier.

2. The method of claim 1, receiving the measurement data generated by the first base station comprises receiving measurement data generated by the first base station in response to the first mobile unit performing at least one of an attach procedure, a service request procedure, an idle mode procedure, a handoff procedure, a release procedure, or a detach procedure.

3. The method of claim 1, wherein receiving the measurement data comprising a temporary identifier comprises receiving measurement data comprising a temporary identifier assigned by the first base station and made known to the first mobility management entity.

4. The method of claim 1, wherein determining the permanent identifier comprises determining an international mobile subscriber identity of the first mobile unit using the temporary identifier.

5. The method of claim 1, wherein the previously collected measurement data were collected by at least one of the mobility management entities, the base stations, or one of a plurality of gateways in the wireless communication system.

6. The method of claim 5, wherein combining the measurement data comprises correlating the measurement data generated by the first base station with the measurement data generated by the first mobility management entity for the first mobile unit and the previously collected measurement data.

7. The method of claim 6, wherein the measurement data and the previously collected measurement data comprises timing information, and wherein correlating the measurement data generated by the first base station with the measurement data generated by the first mobility management entity for the first mobile unit and with the previously collected measurement data comprises correlating the measurement data with the previously collected measurement data using the timing information to correlate data that is generated during simultaneous or current time intervals.

8. The method of claim 1, comprising providing the first record to a post-processing entity.

9. The method of claim 8, wherein providing the first record to the post-processing entity comprises providing the first record in response to a request from the post-processing entity for measurement data for the first mobile unit.

10. The method of claim 1, comprising providing, from the plurality of mobility management entities to the plurality of base stations, an instruction to begin collecting measurement data or an instruction to stop collecting measurement data.

11. The method of claim 10, wherein receiving the measurement data comprises receiving the measurement data in response to providing the instruction to begin collecting measurement data or the instruction to stop collecting measurement data.

12. The method of claim 1, comprising forming the first record using measurement data generated during a first time interval and then storing the first record in a data storage device at the end of the first time interval.

13. The method of claim 12, comprising transmitting, from the first mobility management entity to a data collection server, a notification including information indicative of a file including the first record stored in the data storage device.

14. The method of claim 13, comprising transmitting, from the first mobility management entity to a data collection server, the file including the first record.

15. A method for implementation in a wireless communication system comprising a plurality of base stations and a plurality of mobility management entities, comprising:
    generating, at a first base station, measurement data for a first mobile unit having a connection to the wireless communication system via the first base station; and
    providing, from the first base station to a first mobility management entity, the measurement data and a temporary identifier associated with the first mobile unit for the duration of the connection, wherein providing the measurement data and the temporary identifier comprises providing the temporary identifier so that the first mobility management entity identifies the first mobile unit using the temporary identifier, determine a permanent identifier that uniquely identifies the first mobile unit based on the temporary identifier, and combine the measurement data generated by the first base station for the first mobile unit, measurement data generated by the first mobility management entity for the first mobile unit, and previously collected measurement data for the first mobile unit to form a first record that is uniquely associated with the first mobile unit, and wherein the first record is indexed by the permanent identifier.

16. The method of claim 15, comprising receiving an instruction to begin collecting measurement data from the first mobility management entity, and wherein collecting the measurement data for the first mobile unit comprises generating the measurement data for the first mobile unit in response to receiving the instruction to begin collecting measurement data from the first mobility management entity.

17. The method of claim 16, wherein generating the measurement data comprises generating the measurement data in response to performing at least one of an attach procedure, a service request procedure, an idle mode procedure, a handoff procedure, a release procedure, or a detach procedure.

18. The method of claim 17, further comprising ending collection of the measurement data in response to receiving an instruction from the first mobility management entity to stop collecting measurement data.

19. The method of claim 15, wherein providing the temporary identifier comprises providing a temporary identifier assigned by the first base station and made known to the first mobility management entity.

20. The method of claim 19, wherein providing the temporary identifier comprises providing a temporary identifier that the first mobility management entity can use to determine an international mobile subscriber identity of the first mobile unit.

21. The method of claim 20, wherein providing the temporary identifier comprises providing the temporary identifier so that the first mobility management entity can use the temporary identifier to combine the measurement data generated by the first base station with the previously collected measurement data for the first mobile unit, the previously collected measurement data having been generated by at least one of the mobility management entities, the base stations, or one of a plurality of gateways in the wireless communication system.

22. A method for implementation in a wireless communication system comprising a plurality of base stations, a plurality of gateways, and a plurality of mobility management entities, comprising:
    generating, at a first gateway, measurement data for a first mobile unit having a connection to the wireless communication system via a first base station; and
    providing, from the first gateway to a first mobility management entity, the measurement data and a permanent identifier associated with the first mobile unit, wherein providing the measurement data and the permanent identifier comprises providing the permanent identifier so that the first mobility management entity can identify the first mobile unit using the permanent identifier and combine the measurement data generated by the first gateway for the first mobile unit, measurement data generated by the first mobility management entity for the first mobile unit, and previously collected measurement data for the first mobile unit to form a first record that is uniquely associated with the first mobile unit, and wherein the first record is indexed by the permanent identifier.

23. The method of claim 22, wherein generating the measurement data for the first mobile unit comprises generating the measurement data for the first mobile unit in response to receiving an instruction to begin collecting measurement data from the first mobility management entity.

24. The method of claim 22, further comprising ending collection of the measurement data in response to receiving an instruction from the first mobility management entity to stop collecting measurement data.

* * * * *